US012039488B2

(12) United States Patent
Marquette et al.

(10) Patent No.: US 12,039,488 B2
(45) Date of Patent: Jul. 16, 2024

(54) INVENTORY MANAGEMENT SYSTEM WITH POSITION DETERMINATION OF STORAGE GOODS AND ASSOCIATED STORAGE REGIONS

(71) Applicant: Würth International AG, Chur (CH)

(72) Inventors: Adrien Marquette, Schwäbisch Hall (DE); Wolfgang Hohl, Amrichshausen (DE)

(73) Assignee: Würth International AG, Chur (CH)

( * ) Notice: Subject to any disclaimer, the term of this patent is extended or adjusted under 35 U.S.C. 154(b) by 173 days.

(21) Appl. No.: 16/671,282

(22) Filed: Nov. 1, 2019

(65) Prior Publication Data

US 2020/0143315 A1 May 7, 2020

(30) Foreign Application Priority Data

Nov. 7, 2018 (EP) .................................... 18290129

(51) Int. Cl.
*G06Q 10/087* (2023.01)
*G06V 20/64* (2022.01)
*H04W 4/80* (2018.01)

(52) U.S. Cl.
CPC .......... *G06Q 10/087* (2013.01); *G06V 20/64* (2022.01); *H04W 4/80* (2018.02)

(58) Field of Classification Search
CPC ....... H04W 4/80; G06K 9/00201; G06K 9/78; G06Q 10/087; G06V 20/64
See application file for complete search history.

(56) References Cited

U.S. PATENT DOCUMENTS 9,833,254 B1 * 12/2017 Barral .................... A61B 17/02
2014/0129395 A1    5/2014 Groenovelt et al.
(Continued)

FOREIGN PATENT DOCUMENTS

DE    102013222263 A1    4/2015
WO    2016166698 A1    10/2016

OTHER PUBLICATIONS

Hui Lui, Survey of Wireless Indoor Positioning Techniques and Systems, Nov. 2007, IEEE Transactions on Systems, Man and Cybernetics—Part C: Applications and Reviews, vol. 37, No. 6, pp. 1067-1080. (Year: 2007).*

(Continued)

*Primary Examiner* — Allen C Chein
*Assistant Examiner* — Aaron N Tutor
(74) *Attorney, Agent, or Firm* — Robert A. Blaha; Smith Tempel Blaha LLC

(57) ABSTRACT

Inventory management system, having a plurality of storage regions, which are to be loaded with storage goods, a plurality of storage goods, which are arranged at the storage regions, a plurality storage region identification devices, of which each one is located at an associated one of the storage regions, a plurality of storage goods identification devices, of which each one is located at an associated one of the storage goods, and a determination device, which is, by recognizing the storage region identification devices and the storage goods identification devices and by recognizing positions of the storage region identification devices and the storage goods identification devices, configured for determining a data record, which is indicative for each one of the storage goods and for each of the storage regions as to which storage good is located at which storage region at which position.

10 Claims, 4 Drawing Sheets

(56) References Cited

U.S. PATENT DOCUMENTS

| | | | | |
|---|---|---|---|---|
| 2015/0279172 A1* | 10/2015 | Hyde | ............... | G16H 20/30 |
| | | | | 340/815.4 |
| 2016/0110701 A1* | 4/2016 | Herring | ............ | G06Q 30/0639 |
| | | | | 705/17 |
| 2017/0358089 A1* | 12/2017 | Miyazato | ............... | G06T 7/60 |
| 2018/0005035 A1* | 1/2018 | Bogolea | ............... | B25J 19/023 |
| 2018/0005446 A1* | 1/2018 | Elazary | ............... | G06T 7/20 |
| 2019/0034864 A1* | 1/2019 | Skaff | ............... | G06Q 10/087 |
| 2019/0347611 A1* | 11/2019 | Fisher | ............... | G06V 20/52 |
| 2020/0338763 A1* | 10/2020 | Tang | ............... | G05D 1/0246 |

OTHER PUBLICATIONS

Scandit, In-Aisle Smartphone-Based Scanning for Retail, available at https://www.scanit.com/resources/videos/scandit-retail-aisle-innovation/, as downloaded on Nov. 1, 2019.

Google, ML Kit for Firebase, available at https://firebase.google.com/docs/ml-kit/, as downloaded on Nov. 1, 2019.

\* cited by examiner

INVENTORY MANAGEMENT SYSTEM WITH POSITION DETERMINATION OF STORAGE GOODS AND ASSOCIATED STORAGE REGIONS

CROSS-REFERENCE TO RELATED APPLICATIONS

The present application is a subsequent application to, and claims the benefit of the filing date of, the European patent application no. EP 18 290 129.8 filed Nov. 7, 2018, which is incorporated herein by reference in its entirety.

FIELD OF THE INVENTION

The invention relates to an inventory management system, a method for managing an inventory, a computer-readable storage medium, and a software-program.

TECHNOLOGICAL BACKGROUND

The logistic handling of large storehouses conventionally represents a great challenge in particular, if the quantities of goods are large, the kinds of goods are strongly diversified, the goods and the stock of products (or goods in stock) are subject to a frequent change, and the individual storage locations of the goods are spatially far from each other and/or also the storage locations change frequently.

Such stocks of products are conventionally managed computer-assistedly. People control decentrally the stocks of products and re-order goods locally as necessary. This method is slow, time-consuming, labour-intensive and requires many decentral resources due to the local processing of individual stocks of products.

SUMMARY OF THE INVENTION

There may be a need to provide a resource-preserving and error-robust inventory management system that is capable to function.

This object is solved by the subjects having the features according to independent patent claims. Further embodiment examples are shown in the dependent claims.

According to an embodiment example of the present invention, there is established an inventory management system (which may also be referred to as an inventory management arrangement), which has the following: a plurality of storage regions, which are to be loaded with storage goods; a plurality of storage goods, which are arranged at the storage regions; a plurality of storage region identification devices (i.e. identification devices, which allow an identification of an associated storage region), of which each one is located at an associated one of the storage regions; a plurality of storage goods identification devices (i.e. identification devices, which allow an identification of an associated storage good), of which each one is located at an associated one of the storage goods; and a determination device, which is, by recognizing the storage region identification devices and the storage goods identification devices and by recognizing of positions of the storage region identification devices and the storage goods identification devices, configured for determining a data record, which is indicative for each one of the storage goods and for each one of the storage regions as to which storage good is located at which storage region at which position (in particular, at which position the respective storage good is located and/or at which position the respective storage region is located and/or at which position the respective storage goods identification device is located and/or at which position the respective storage region identification device is located).

According to a further embodiment example of the present invention, there is provided a method for managing an inventory (or storehouse, or storage) having a plurality of storage regions, which are to be loaded with storage goods, and a plurality of storage goods which are arranged at the storage regions, wherein a respective one of a plurality of storage region identification devices is located at an associated one of the storage regions, and wherein a respective one of a plurality of storage goods identification devices is located at an associated one of the storage goods, wherein the method has: a recognizing of the storage region identification devices and the storage goods identification devices and of positions of the storage region identification devices and the storage goods identification devices, and a determining of a data record based on the recognized storage region identification devices and storage goods identification devices and their positions, wherein the data record is indicative for each one of the storage goods and for each one of the storage regions as to which storage good is located at which storage region at which position.

In a computer-readable storage medium according to an embodiment example of the present invention, there is stored a program for managing an inventory having a plurality of storage regions, which are to be loaded with storage goods, and a plurality of storage goods, which are arranged at the storage regions, which program has and/or executes the method steps described above, if it is executed by one or plural processors.

A software program (for example formed by one or plural computer program elements) according to an embodiment example of the present invention for managing an inventory having a plurality of storage regions, which are to be loaded with storage goods, and a plurality of storage goods, which are arranged at the storage regions, has the method steps described above (and/or performs the latter or controls the latter), if it is executed by one or plural processors.

Embodiment examples of the present invention may be realized both by a computer program, that may be by a software, and by one or plural special electric circuits, that may be in hardware, or in arbitrary hybrid form, that may be by software components and hardware components.

In the framework of this application, the term "inventory management system" may be understood in particular as a wholly or partially automated and preferably network-based arrangement of entities and/or nodes that may be preferably coupled or couplable to each other capably to communicate, which arrangement may capture qualitatively and/or quantitatively an inventory of storage goods at and/or in storage regions, which inventory may exists at a defined point in time, and may determine corresponding position information and association information of storage goods and storage regions. In particular, such an inventory management system may optionally trigger re-orders of storage goods— for example self-actingly (or automatically) and/or user-controlled. Such an inventory management system and/or stock of products management system may, as the case may be, make accessible the captured inventory and/or information derived therefrom to an operator and/or may trigger an event self-actingly based on the result of the capturing.

In the framework of this application, the term "storage goods" may be understood in particular as a manageable and/or tradeable physical body, which together with many other storage goods may form an inventory (or stock of inventory) that may be subject to a continuous change.

Examples for such storage goods may be in particular technical objects or components, such as for example tool components (for example hammer, screwdriver, etc.) or consumption components (for example screws, nails, dowels, etc.). In the framework of an exemplary embodiment example, an inventory of such storage goods may be subject to the change in particular with regard to the quantity of storage goods at individual or all storage regions and/or also the kind and/or the type of storage goods. This may mean that new storage goods (such as already present ones or not yet present ones) may be added to the inventory and/or existing storage goods may be removed from the inventory. Examples for a kind and/or a type of such storage goods may be: contents of carrying cases, machine components, the contents of a machine case, tool stakes (or tool inserts), canisters, cans, bottles, cartridges, tubes and/or contents of drawers.

In the framework of this application, the term "storage region" may be understood in particular as a receiving device, at and/or in which storage goods are received or may be received according to intended use. A respective storage region and storage goods respectively belonging to or being associated to the former may be adapted with respect to each other, in particular with regard to dimension and/or shape. In result of such a specific adaptation between storage good and associated storage region, a defined number of occupancy places may be associated to a particular storage region, of which occupancy places each one may be configured for receiving a storage good or a particular amount of storage goods of the prescribed type. It may be possible that a storage region may be configured only for receiving a specific type of storage goods (for example, if the storage region has similar compartments, of which each one may be shaped and dimensioned such that for example only a very specifically shaped and dimensioned article packaging or article itself may be accommodated in the respective compartment). However, it may also be possible that a storage region may be configured for receiving different types of storage goods (for example, if the storage region has different types of compartments, of which each type may be shaped and dimensioned such that for example a very specifically shaped and dimensioned article packaging or article itself may be accommodated in the respective compartment of the respective type). An example for this may be a toolbox having pre-shaped and differently dimensioned and/or shaped receiving recesses for receiving special tools.

"Storage region identification devices" can be understood in particular as all features of a storage region or features attached to a storage region, which may be capturable (or measurable) by a capturing device and may enable an (in particular unambiguous) association and/or identification of the storage region by means of the detectable storage region identification device. For example, the mentioned storage region identification devices may be transponders having a preferably unique identifier. However, it may also be possible to identify (in particular uniquely) a storage region by the fact that the storage region may have a shape, colour and/or other characteristics that may be different from (in particular all) other storage regions.

In the framework of the present application, the term "storage goods identification device" may be understood in particular as each feature, which may enable an (in particular unambiguous) identification of an associated storage good. This may be effected for example by an (in particular unique) identifier, such as for example a (in particular unique (or unparalleled)) QR code, which may identify (in particular uniquely) the associated storage good. Thus, a storage goods identification device may be attached to an associated storage good or may be an intrinsic feature of the storage good, which may enable the (in particular unique) identification thereof.

According to an exemplary embodiment example of the invention, there is established a preferably fully automatically operatable and very error-robust inventory management system, in which a (in particular unique) mutual assignment of storage goods and associated storage regions for receiving and/or storing an associated storage good may be enabled by an associated storage region identification device and/or an associated storage goods identification device. Moreover, in the inventory management system, a determination of the position of individual storage goods and individual storage regions may be effected, and corresponding position information may be associated to the groups of storage good/storage region associated to each other. Then, even for complex storehouses, an association may be effected in the form of an electronic data record, which may for example be searched easily as to which storage good is located at which storage region, and which position the storage good and/or the associated storage region may have. This may enable a unique and easy access to each storage good of complex storehouse, and may facilitate the management of complex storehouses having huge amounts of storage goods and storage regions. By determining a data record, which may undertake a unique association of each storage good to an associated storage region by means of the storage goods identification devices and/or the storage region identification devices, and which in addition may store the position of each storage good and each storage region in the form of data elements, it may be possible to determine at each point in time quickly, easily and error-robustly as to which storage good may be present where and in which storage region. User activities in relation to a corresponding inventory management may not necessary be compulsorily. Such an inventory management system may at any time be expanded by the addition of storage regions and/or storage goods and/or may be reduced by the withdrawal of storage goods and/or storage regions. Stated differently, the data record, which may be determined by the determination device, may contain the coordinates of all storage goods and storage regions, and may link them with each other in the sense of an association of storage goods to storage regions. Thereby, it may not be necessary to store more information than may be required for a unique and error-free inventory managing. An inventory management system according to an exemplary embodiment example of the invention may be resource-preserving both in terms of hardware and also in terms of software, and also with regard to the data amounts to be managed.

In the following, additional exemplary embodiment examples of the inventory management system, the method, the computer-readable storage medium, and the software program are described.

According to an exemplary embodiment example, the inventory management system may have an interrogation device, which may be configured to interrogate, for each one of the storage goods by an interrogation at the determining device at least one associated storage region, at which a respective storage good may be located, and/or to interrogate for each one of the storage regions by an interrogation at the determining device at least one associated storage good, which may be located at the respective storage region. Such an interrogation may for example be desirable, if the withdrawal of a storage good from the storehouse is required for a performing of a task. By a simple database interrogation, the position and the storage region of the storage good may be determined, and for example a robot may be controlled for the transport of the identified and interrogated storage good to a further-processing-location.

According to an exemplary embodiment example, the storage goods may be selected from a group that consists of: tools, fluid sources, C-materials, vouchers for an article and/or a service, and a dash button. Also, small parts or C-materials (i.e. articles, which are classified according to an ABC analysis known to a skilled person, which articles may assume a relatively low value proportion of for example 5% to 10%, but which may have a relatively high amount proportion of for example 50% to 70%, for example screws, screw nuts) may be managed as storage goods in this manner. A dash button may be understood in particular as a thumbnail-sized press button, which may be actuated by a user in order to send a command signal via a communications network (in particular by WLAN) to a node that may be coupled capably to communicate. By a mere actuating a dash button, for example a re-ordering of a storage good, which may be associated to the dash button, may be triggered. However, also all other kinds of storage goods may be managed with the inventory management system, insofar as these may be connected to a storage goods identification device or contain an intrinsic storage goods identification device due to their own characteristic (shape, colour, labelling, etc.).

According to an exemplary embodiment example, the storage regions may be selected from a group that consists of: a rack or a part of a rack (in particular a shelf of a rack), a tool and gear wagon or a part of a tool and gear wagon (in particular a work surface or a drawer of the tool and gear wagon), a carrying case or a part of a carrying case (in particular a carrying case compartment of a carrying case), a wall-mountable suspension position or a part of a wall-mountable suspension position, and a storage box or a part of a storage box. All other kinds of storage regions may also be possible, insofar as these may carry a storage region identification device or may act as a storage region identification device due to their intrinsic properties.

According to an exemplary embodiment example, the storage region identification devices may be selected from a group that consists of: a transponder (in particular an RFID tag), an optically readable code (in particular a barcode, QR code or an alphanumeric code), and a predetermined geometrical outline (in particular a predeterminedly pigmented geometrical outline). In particular, a storage region identification device may also be formed by an arrangement of plural predetermined geometrical outlines, which advantageously serve, can be drawn on and/or are sufficient for the definition of outer delimitations of a storage region. It may thus be possible to attach a corresponding bodily structure at the corresponding storage region as a storage region identification device. Examples for this are for example transponders, which may be glued on the associated storage region and may be read out by a transponder reading device. However, it may also be possible to use abstract information for the storage region identification, such as for example an outline that may be capturable by a camera, which may be recognized by methods of the automated image recognition and may be drawn on for an identification of the storage region. Herein, an intrinsic storage region identification device may be concerned, which may be defined by the characteristics of the storage region itself, without it being necessary to attach an external physical body at the storage region for this purpose.

According to an exemplary embodiment example, the storage goods identification devices may be selected from a group that consists of: a transponder (in particular an RFID tag), an optically readable code (in particular a barcode, a QR code or an alphanumeric code), and a predetermined geometrical outline (in particular a predeterminedly pigmented geometrical outline). For the storage goods identification devices thus a distinction may be made between physical structures (for example transponder), which may be attached to the storage good to be identified, and intrinsic properties of the storage good itself for the identification thereof. In the case of an intrinsic storage goods identification device, thus, an intrinsic property of the storage good itself may be concerned, which may be captured by a sensor and may enable the identification thereof (for example by the fact that the determination device may use methods of the image processing in order to identify the storage good by means of an image of the storage goods, for example by means of a labelling or an outline).

According to an exemplary embodiment example, the inventory management system may have a capturing device (or acquisitioning device), which may be configured for capturing (or acquiring) capturing data (or acquisition data), which may map at least a part of the storage regions and/or at least a part of the storage goods as a basis for the determining of the data record. In particular, the capturing data may represent the storage region identification devices and/or the storage goods identification devices. Such a capturing device may thus record image data of the storage goods and/or the storage regions in order to identify thereon the storage region identification devices and/or the storage goods identification devices. Thus, also an identification of the storage goods and/or storage regions associated to the image data may be enabled. If during the recording of a respective image also the associated coordinates and/or orientation of the capturing device and/or the storage goods and/or storage regions that have been captured by image technology are stored, then, after an identification of storage goods and/or storage regions on the image data, also a determination of the associated position of the storage goods and/or the position of the storage region may be possible.

According to an exemplary embodiment example, the capturing device may have a camera, which may be movable along the storage regions and/or rotatable, for capturing image data and/or at least a transponder reading device, which may be movable along the storage regions, for capturing transponder data. Thus, a camera that may be movable in the longitudinal direction (in one, two or three spatial directions) and/or rotatable, may enable to capture the positions of the storage goods and the storage regions in a simple manner. For this purpose, also the position of the camera during the recording of particular image data may be drawn on.

The reading out of transponders may be effected contactlessly, like the reading out by a camera, and may also be very error-robust. Since in the reading out of a transponder the transponder reading device must be brought in a readability distance to the associated storage region identification device or storage goods identification device, an erroneous capturing of wrong transponders may thus be avoided reliably.

According to an exemplary embodiment example, the determination device may be configured to determine at least a part of the storage regions and/or at least a part of the storage goods by image recognition based on image data that may have been captured by the at least one camera, in particular by using the storage region identification devices and/or the storage goods identification devices. As a basis for the performed image recognition, the determination device may access a database, in which pattern data of expected storage regions and/or storage goods may be stored. The determination device may then search according patterns on the captured images and may thereby identify storage regions and/or storage goods.

According to an exemplary embodiment example, the determination device may be configured to identify space coordinates, in particular three-dimensional space coordinates, as at least a part of the data record for at least a part of the storage goods and for at least a part of the storage regions. By determining and storing two- or three-dimensional coordinates (for example Cartesian coordinates or spherical coordinates) for the individual storage goods and/or storage regions, for example a robot system may fetch individual storage goods from associated storage regions. For this purpose, only the three-dimensional space coordinate of the desired storage good may have to be transmitted to the robot. With advantage, it may also be possible to capture and/or to transmit a set of space coordinates for at least a part of the storage goods and/or for at least a part of the storage regions, which space coordinates may indicate not only the whereabouts, but also the physical delimitations of the respective storage good and/or the respective storage region.

According to an exemplary embodiment example, the determination device may be configured to convert two-dimensional space coordinates, which may have been captured by the capturing device, of at least a part of the storage goods and/or of at least a part of the storage regions to three-dimensional space coordinates of at least a part of the storage goods and/or of at least a part of the storage regions. By methods of triangulation and/or other mathematical models, it may be possible to determine three-dimensional space coordinates from a set of two-dimensional space coordinates. If the three-dimensional space coordinates are determined and stored, an access to the individual storage regions and/or storage goods may be possible with still higher precision.

According to an exemplary embodiment, the determination device may be configured to associate space coordinates of the storage goods to space coordinates of a respective associated storage region. If space coordinates of the storage goods are associated to space coordinates of the associated storage regions, a robot may for example access directly a particular position in this storage region for example after moving to a particular storage region in a large size storehouse, in order to withdraw a storage good that is located there. The association of space coordinates of storage goods to space coordinates of storage regions may thus be particularly advantageous.

According to an exemplary embodiment example, the inventory management system may have a user interface (which may also be referred to a user end device) for displaying at least a part of the data record. Alternatively or in addition, the user interface and/or the user end device may be configured for inputting at least one control command for controlling the inventory management system. Such a user interface may have a display device and/or an input device. A display device may allow the graphic display of at least one storage region and/or at least one storage good in a visually capturable manner (or form). An input device may allow the input of user commands for controlling the inventory management system.

According to an exemplary embodiment example, the user interface may be configured for displaying at least a part of the data record by Augmented Reality, in particular at a portable or carriable ("wearable") user interface. Augmented Reality (or extended reality) may be understood in particular as the computer-supported extension of the perception of reality by the provision of additional information. This information may address all modalities of human sense. In particular, extended reality may be understood as the visual representation of information, thus the supplementation of images or videos by computer-generated additional information or virtual objects by means of superimposing (or overlaying) and/or superposition. By incorporating elements of Augmented Reality in the display of storage goods and/or storage regions, a human user may be instructed (or guided) particularly intuitively to manage the inventory (or the storehouse). For this purpose, for example, a portable display device, for example a hand-held device, such as a smartphone, may be employed. It may also be possible to implement an Augmented Reality pair of spectacles or the like as a wearable display device. If a user, who carries such a wearable display device or takes with him such a portable display device, directs the display device to a part of the storehouse, a presently recorded image of this storage region and/or of this storage good may be displayed on the display device to the user, supplemented by additional information (for example about the storage good and/or the storage region), in order to simplify the inventory management for the user.

According to an exemplary embodiment example, at least a part of the storage region identification devices may define a spatial delimitation of an associated one of the storage regions. For example, the outer limits of a rectangular shelf may be defined by four red dots in the corner regions. By recognizing these storage region identification devices, also the extension of a corresponding storage region may then be incorporated in the data record. Then, for associated storage goods, it may not only be defined that these are located in this storage region, but also at which position in this storage region they may be located.

According to an exemplary embodiment example, the inventory management system may have a re-order device, which may be configured to trigger a re-order of at least one of the storage goods, if a predetermined re-order event is captured. With the described inventory management system, also the re-order, that is the supplementation of the inventory, may be simplified. For this purpose, a re-order device may capture a predetermined re-order event and may then trigger the re-order (for example via a network, such as the Internet).

According to an exemplary embodiment example, the presence of a re-order event may be capturable by the capturing device. The capturing device, which may captures storage goods and/or storage regions, may also capture the non-presence (or absence) of a storage good or of plural storage goods in a storage region. For example, the capturing device may capture that all storage goods of a storage region are out of stock, or that the residual amount of storage goods in the storage region is below a predetermined threshold value. If this has been captured (for example optically), this may be reported to the re-order device. A person responsible for the re-order may then trigger the re-order.

According to an exemplary embodiment, the presence of a re-order event may be capturable in the form of a user activity. In particular, the presence of a re-order event may be capturable by a predetermined user gesture that may have been captured by the capturing device. For example, a re-order may be triggered by a user pointing, with a predefined and/or agreed user gesture, to a storage good to be re-ordered and/or a storage region that may be associated to a storage good to be re-ordered. Thus, for example, it may also be possible that a user, who may recognize the missing of storage goods in a storage region, may trigger the re-order. For this purpose, for example a predetermined user gesture, which may be captured by a capturing device, may be sufficient. For example, a particular hand orientation (for example an erected index finger of a user, which may point to a storage region that is vacated of associated storage goods) or a particular movement of the hand (for example a flipping with the hand, which may point to a vacated storage region) may be used as a predetermined user gesture. Thereby, a storage supplementation may be triggered in a particular simple and intuitive manner.

According to an exemplary embodiment example, the predetermined re-order event may be selected from a group that consists of: the decreasing of a number of remaining storage goods at at least one associated storage region under a predetermined threshold value, an information that may be indicative for the withdrawal of a number of storage goods from at least one associated storage region, a user-side re-order command, and an information that may indicate a withdrawal need. Of course, also other re-order events may be definable, the presence of which may trigger a re-order.

According to an exemplary embodiment example, the determination device for determining a data record may be configured such that the data record may be indicative for each one of the storage goods as to in which sub-region of a respective storage region the respective storage good may be located. With advantage, not only may an associated storage region (for example a shelf of a rack) be associated to each storage good, but may contain spatial additional information to the extent as to in which sub-region of the storage region the respective storage good may be localized. For example, a plurality of storage boxes, which may receive storage goods, may stand on a shelf of a rack. The data record may then associate to a respective storage good not only the associated shelf of a rack as a storage region, but in addition a sub-region of the shelf of the rack, at which the storage good may be located. Thereby, the association of storage goods to particular locations in the inventory management system may be extended by a hierarchy level and thus may be refined.

According to an exemplary embodiment example, the inventory management system may have a user position finding device, which may be configured for finding a position (i.e. for positioning) at least one human user in the region of the inventory management system, and for controlling the inventory management system such that at least movable components of the inventory management system may be located only in observance of a (for example prescribable spatial) safety distance to a position-found user. As has been described above, the inventory management system may have movable components, for example a camera, which may be spatially movable and/or rotatable for capturing storage goods and/or storage regions, and/or a robot, which may bring storage goods to an associated storage region or may remove storage goods from an associated storage region. Aiming to avoid that undesired collisions between human users and such movable components occur, the user position finding device may recognize the users working in the region of the inventory management system, and may control the movable components accordingly to avoid collisions. Thereby, the operational safety during the operation of the inventory management system may be increased significantly.

According to an exemplary embodiment example, the determination device may be configured to capture capturing data exclusively in a space region, which may be delimited by the storage regions and storage goods. Thus, a space region may be defined according to an associated storage region, to which the capturing activity of cameras of the determination device may be limited. In this manner, it may be ensured that a capturing may occur only in the storage region and/or in the region of the storage goods, and that thus no surveillance of other storage sections of the storehouse may occur. This may be advantageous for reasons of protection of data privacy, occupational health and safety (or protection of labour) and for the ensuring of company secrets, and may be achieved by the described technical implementation of the inventory management system.

BRIEF DESCRIPTION OF THE DRAWINGS

In the following, exemplary embodiment examples of the present invention are described in detail with reference to the following drawings.

Same or similar components in different figures are provided with same reference numerals.

DETAILED DESCRIPTION OF EXEMPLARY EMBODIMENTS

Figure 1:
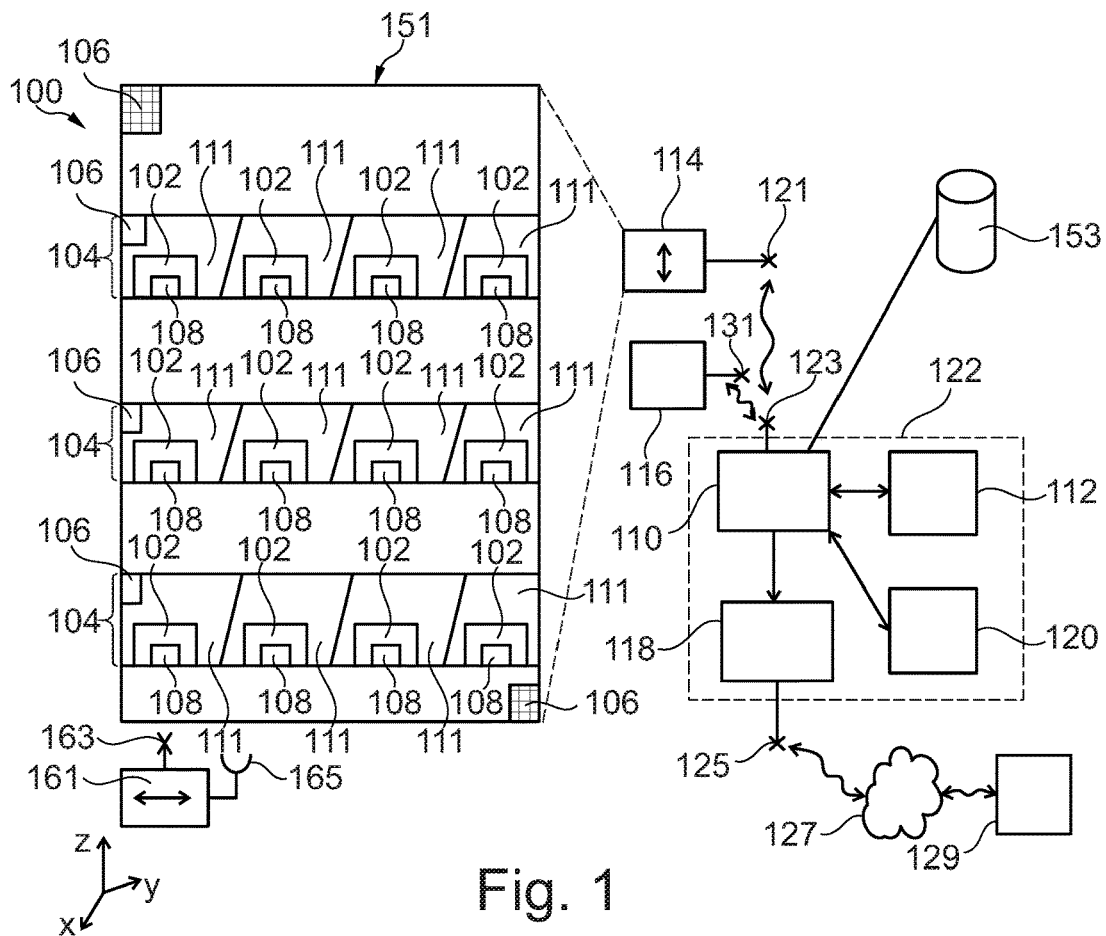
FIG. 1 shows an inventory management system according to an exemplary embodiment example of the invention.

Before exemplary embodiment examples of the invention are described with reference to the drawings, some general aspects of embodiment examples of the invention shall still be explained:

According to an exemplary embodiment example of the invention, there may be established an inventory management system, in which a storage region may be defined, at which storage good may be stored (for example a rack having shelves of the rack). The storage region may be characterized by a storage region identification device. This may be for example carried out actively by a QR code, a barcode, a geometrical outline (for example a triangle, a red dot), etc. The identification may however also be performed automatically, for example by an image recognition software, which may recognize a particular storage region (for example a rack), for example by methods of pattern recognition.

Furthermore, it may be possible to define storage goods (for example articles, which pertain to the storehouse) in the storage region. The defined storage goods may be characterized actively by a storage goods identification device. For example, the storage goods may be provided with a barcode, an alphanumeric code (for example an article number), a QR code, an RFID tag, etc. However, it may also be possible to recognize individual storage goods automatically, for example by an image recognition software, which may recognize articles (for example by methods of pattern recognition).

Then, the storage location of the storage good in the associated storage region may be defined. This may be effected for example in that a storage location (for example in the form of a coordinate) may be associated to a storage good (for example an article). In particular, a coordinate capture (or acquisition) of the storage goods may be effected by a coordinates scanner for storage good.

With advantage, an association of the respective storage good and/or article to coordinates in the storage region may be performed.

The coordinates scanner for storage good may have for example a camera or consist thereof. For example, a photographic acquisition (or capturing) of the storage region with the storage good may be performed with the help of an optical camera. According to an exemplary embodiment example, a user may guide a camera of a smartphone or another portable device along the storage region (for example a rack). However, such a camera may also be guided and started on a robot arm.

A software may recognize a storage goods identification device (for example, a barcode of an article may be read). A software may convert corresponding two-dimensional coordinates to three-dimensional coordinates in space. Thus, the precise storage location of the storage goods in the storage region may be known.

The coordinates scanner for storage good may be for example an RFID scanner, the movement of which in space may also be captured. Such an RFID scanner may be guided along a storage region (for example the articles at the rack) for an identification of the storage goods, like a coordinates scanner of storage good that may be implemented as a camera. In result, an association between coordinate and storage good may be obtained. Thereby, the storage region (for example the rack) may be defined. Thereby, it may further be known, which storage good (in particular which article) is arranged at which location in the storage region.

For example, the storage goods may comprise tools (for example drilling machines, disk-type sanders, screwdrivers), aerosol cans (for example enamelling (or paint finishing) cans). A storage good may also contain a voucher for an article and/or a service. Also, a dash button having an article number or a shopping list of articles may be a storage good.

A storage region may be for example a rack, a shelf of the rack in a rack, at least one shelf of a rack, a tool and gear wagon, a work surface on the tool and gear wagon, at least one drawer in a shelf or a tool and gear wagon, a carrying case, at least one compartment in a carrying case, a suspension location at the wall for sawing blades of a circular saw, large tools, etc. Also, a storage box or the contents thereof may be a storage region.

A result of an inventory managing may be represented on a display device. For example, the display device may be a monitor of a personal computer, a display device of a mobile communication device, a tablet, a laptop, or a display in and/or at a pair of spectacles.

The identification of the storage region by a storage region identification device may be for example a QR code or a barcode or another marker (for example at the four corner points of a rectangular storage region). Also, a coloured border of the storage region may be used for this purpose. Stated more generally, an arbitrary outline, which may be defined as a corner point of an edge of the storage region (for example red squares), may be employed as a storage region identification device. Plural outlines may define the edge of the storage region as a polygon.

A photographic capturing (or acquisition) of a storage region and/or of storage goods may be effected for example by an optical camera, which may generate a photo and/or a video of the storage region. Optionally, in addition, a transmitter and/or receiver of further frequencies may be provided. Movements of a human in the storehouse may be captured, and may be distinguished from objects by an infrared sensor.

For example, a laser transmitter and/or a laser receiver may be implemented, for example to read barcodes on storage goods. However, also a capturing by an RFID sensor, which may identify storage goods, may be possible.

According to exemplary embodiment examples of the invention, also a re-order of storage goods may be simplified by using a described inventory management system:

According to an embodiment example in this regard, at first, a storage location and/or storage region on the one hand or a storage good on the other hand may be selected, for which it may be and/or which may have to be re-ordered. This selection may be made for example also by a user via a photo or a video of a storage region and/or a storage good. A user may select a particular storage region (for example a rack) by a gesture that may be recognizable by automated image recognition, for example by pointing with the finger to a storage region and/or a storage good (for example by pointing to a rack and/or to an article in the rack). On the basis of a thus captured order request, ordering information may then be generated, for example using a particular software (for example an App running on a mobile communication device). This ordering information may be transmitted to a merchant or a person responsible for orderings. This may be effected for example via a communications network, for example via Internet, per email, per SMS, etc.

For example, a selection of a storage good to be re-ordered may be effected by a comparison with a list of lastly ordered storage goods, by a comparison with a predetermined shopping list, by an identification of vacated (or emptied) storage region or storage location, and then a marking of the empty storage location or storage region in an optical representation by a computer mouse or a finger of a user. Thereby, an order may be triggered.

It may also be possible, upon recognition of an ordering requirement, to perform a co-ordering of the respective storage goods in a next ordering of storage goods (for example, if a storage location and/or a storage region is empty and articles and/or storage goods are missing).

The mentioned ordering information may comprise the company, in which the storage region may be arranged, as well as an article number and a number of storage goods.

According to an another embodiment example of the invention, for re-ordering, it may be registered by a surveillance camera that no storage goods are there any more. Then, an automated re-order may be triggered.

With advantage, it may be possible to delimit a spatial capturing region for the surveillance camera by a storage region identification device. This may be advantageous so that the software for a surveillance camera may monitor only a desired storage region. For example, it may be desirable that for reasons of protection of data privacy, no surveillance of the whole storehouse shall be effected.

FIG. 1 shows an inventory management system 100 according to an exemplary embodiment example of the invention.

The inventory management system 100 illustrated in FIG. 1 may have a plurality of storage regions 104, which may be loadable with storage goods 102. In the illustrated embodiment example, the storage regions 104 may be shelves of a storage rack 151. Further may be provided a plurality of storage region identification devices 106, each one of which may be located at an associated one of the storage regions 104. In the illustrated embodiment example, the storage region identification devices 106 may be implemented as QR codes.

A plurality of storage goods 102, for example tools, may be arranged at the storage regions 104. Each one of the storage goods 102 may be provided with an associated storage goods identification device 108. Stated more precisely, a storage goods identification device 108 may be stuck on each one of the storage goods 102 and may thus be positioned at an associated one of the storage goods 102.

FIG. 1 also shows a determination device 110, which may be implemented in a processor 122, and which may be configured for determining a data record that may be stored in a database 153. The database 153 may be for example an electronic mass storage, such as for example a hard disk. The data record in the database indicates for each one of the storage goods 102 and for each one of the storage regions 104 that may be correlated with a respective storage good 102, as to which storage good 102 may be located at which storage region 104 at which position. Preferably, the determination device 110 for determining the data record may be configured even such that the data record for each one of the storage goods 102 may be indicative as to in which sub-region 111 of a respective storage region 104 the respective storage good 102 may be located. In the embodiment example according to FIG. 1, each sub-region 111 may correspond to a compartment in an associated storage region 104 (i.e. on an associated shelf of the rack). In the example of FIG. 1, it may thus be interrogated in the database for each one of the storage goods 102 not only, in which shelf and thus in which storage region 104 the respective storage good 102 may be located, but also at which location within the associated storage region 104, i.e. in which sub-region 111, the respective storage good 102 may be positioned. According to FIG. 1, each one of the shelves of the rack may be subdivided in four compartments, wherein each compartment may receive an associated storage good 102. For a particular storage good 102, not only the associated shelf of the rack, but also the associated compartment—as an example for a sub-region 111—of the shelf of the rack may be determined from the database.

The determination of the database by the determination device 110 may be effected with advantage by recognizing the storage region identification devices 106 and the storage goods identification devices 108 and by recognizing positions of the storage region identification devices 106 and the storage goods identification devices 108. Thus, a simple and error-robust recognition of the storage goods 102 with respect to their associated storage region 104 may be enabled.

The inventory management system 100 according to FIG. 1 further may have, as a part of the processor 122, an interrogation device 112, which may be configured to interrogate, by an interrogation at the determination device 110, for each one of the storage goods 102 at least one associated storage region 104, at which a respective storage good 102 may be located. The interrogation device 112 may also interrogate, by an interrogation at the determination device 110, for each one of the storage regions 104 one or plural associated storage goods 102, which may be located at the respective storage region 104.

A capturing device (or acquisitioning device) 114 of the inventory management system 100 may be configured for the capturing of the storage regions 104 and the storage goods 102 by way of measurement techniques. Stated more precisely, the capturing device 114 may capture and/or record capturing data as a basis for the determining of the data record. For this purpose, the capturing device 114 may record image data of the storage regions 104 and/or of the storage goods 102 in the storage regions 104. For this purpose, the capturing device 114 according to the embodiment example of FIG. 1 may contain one or plural cameras for capturing image data, which cameras may be movable along the storage regions 104 and rotatable. Alternatively or in addition, it may also be possible that the capturing device 114 may have one or plural transponder reading devices for capturing transponder data, which devices may be movable along the storage regions 104.

The determination device 114 may be configured to determine the storage regions 104 and the storage goods 102 for example by image recognition and/or other image-processing methods based on the image data captured by the camera(s). To this end, the determination device 110 may evaluate information of the storage region identification devices 106 and the storage goods identification devices 108, which may have been captured by the capturing device 114. For example, the storage region identification devices 106 may define or indicate a spatial delimitation of an associated one of the storage regions 104.

Furthermore, the determination device 110 may be configured to determine, as a part of the data record, three-dimensional space coordinates for the storage goods 102 and for the storage regions 104. This may for example be performed computationally by the data, which may be captured by the capturing device 114. In particular, to this end, the determination device 110 may convert two-dimensional space coordinates of the storage goods 102 and the storage regions 104 that may have been captured by the capturing device 114 to three-dimensional space coordinates of the storage goods 102 and the storage regions 104. This may be effected for example using methods of triangulation. It may also be possible to use for this conversion additional information, which may have been read out from the storage region identification devices 106 and the storage goods identification devices 108. In this manner, the determination device 110 may be capable to associate space coordinates of the storage goods 102 to space coordinates of a respective associated storage region 104.

With advantage, the capturing device 114 may be configured to be able to capture capturing data exclusively in a space region, which may be delimited by the storage regions 104 and the storage goods 102. This may be achieved in terms of hardware in that an angle of view (or a field of vision) of the camera(s) of the capturing device 114 may not be able to capture other space regions. Alternatively or in addition, this may also be achieved in terms of software in that the control software for the capturing device 114 may not permit a capturing of undesired space areas.

FIG. 1 also shows that the inventory management system 100 may have a user end device and/or a user interface 116 for displaying the data record. For example, the user end device and/or the user interface 116 may be a smartphone. The user interface 116 may have input elements (for example a touchscreen) and/or output elements (for example an electronic display device), and may be configured in particular for bidirectionally communicating with the determination device 110 of the inventory management system 100. In one embodiment example of the invention, it may also be possible that the user interface 116 may be configured for displaying the data record or parts thereof by Augmented Reality. This may be achieved advantageously by a portable or carriable ("wearable") user interface 116, for example a user interface 116 having an Augmented Reality pair of spectacles.

Moreover, the inventory management system 100 may also have a re-ordering device 118, which may be configured to trigger a re-order of particular storage goods 102, if a predetermined re-order event that may be related to the storage goods may be captured. The presence of a re-order event may be captured for example by the capturing device 114. For example, the presence of a re-order event in the form of a user activity may be recognized by a predetermined user gesture that may have been captured by the capturing device 114. To this end, for example, it may be captured how a user points with his finger to a storage good 102 to be re-ordered and/or to a storage region 104 that may be associated to a storage good 102 to be re-ordered. Also another, preferably predetermined, user gesture may trigger a re-order of the storage good 102, to which the user gesture may be related.

According to other embodiment examples, other re-order events may trigger the re-ordering of one or plural storage goods 102. For example, the predetermined re-order event may be a sensor-wise captured decrease of the number of remaining storage goods 102 at an associated storage region 104 below a predetermined threshold value. The capturing of a re-order event that may trigger a re-order may also be an information that may be indicative for the withdrawal of a number of storage goods 102 from an associated storage region 104. Also, a re-order command at user-side may be used as a trigger for triggering a re-order. According to another embodiment example, an information, which may indicate a withdrawal need, may be used for triggering the re-order.

According to a preferred embodiment example, the inventory management system 100 may also have a user position finding device 120. The user position finding device 120 may be configured for finding the position of human users in the region of the inventory management system 100. This may be effected for example by an infrared camera, which may distinguish people from objects in the inventory management system 100 on the basis of sensorically captured temperature information and/or temperature distribution information. Alternatively or in addition, people in the inventory management system 100 may also be recognized by methods of automated image recognition, and their position in the inventory management system 100 may be determined in this manner. The user position finding device 120 may further be configured for controlling the inventory management system 100 such that movable components of the inventory management system 100 may be positioned only with observance of a safety distance to a positioned (or position-found) user. For example, a robot, which may move the camera(s) of the capturing device 114, may adapt a trajectory such that a collision between a human being and the robot may be prevented. Thus, the operational safety of the inventory management system 100 may be improved.

In FIG. 1, there is further illustrated a handling device 161, which may be implemented for example as a movable robot, for handling storage goods 102. The handling device 161 may communicate for example with the processor 122 via a communication interface 163, for example in order to receive control commands. In this manner, for example, the processor 122 may control the handling device 161 such that the handling device 161 may move to a storage region 104 that may be defined via its position. The handling device 161 may then withdraw a storage good 102 from the associated storage region 104 for example via a grappler 165, and may bring this to a predetermined destination. It may also be possible that the handling device 161 may bring storage goods 102 to a particular storage region 104 for example by the grappler 165, for example in relation with a re-order.

In FIG. 1, there is thus illustrated an inventory management system 100, in which the storage regions 104 may be shelves of a rack, and the storage goods 102 may be articles, such as for example tools, which may be provided with transponders. For each storage region 104, plural storage goods 102 may be attached at particular positions. In the illustrated embodiment example, the storage region identification devices 106 may be attached as QR codes in the corners of the rack. In the illustrated embodiment example, the storage goods identification devices 108 may be barcodes of the respective articles in the respective shelf, which articles may form a respective storage good 102 in a respective storage region 104. The capturing device 114, which may be implemented as a movable and rotatable camera, may record the images of the rack, and may identify the storage regions 104 by means of the storage region identification devices 106 and the storage goods 102 by means of the storage goods identification devices 108. Furthermore, the positions of the storage regions 104 and of the storage goods 102 may be identified for example by means of the camera images, and optionally by the use of GPS information or the like.

The capturing device 114 may communicate via a communication interface 121, which may be wireless in this embodiment example, with a communication interface 123 of the processor 122, which may be wireless in this embodiment example. The processor 122 may contain the determination device 110, the interrogation device 112, the re-order device 118 and the user position finding device 120.

The re-order device 118 of the processor 112 may communicate via a further communication interface 125 via a communications network 127, for example the Internet, with a subsequent delivery entity 129. The subsequent delivery entity 129 may be a computer of a component supplier, who may execute a re-order of storage goods 102 in response to a corresponding re-order command of the re-order device 118 via the communication interface 125, and may bring them to the inventory management system 100.

In operation of the inventory management system 100, the capturing device 114 may record image data of the storage goods 102 and the storage regions 106, and may move thereby. In this manner, plural two-dimensional projections of the storage goods 102 and/or the storage regions 104 may be recorded. The corresponding image data may optionally be pre-processed by the capturing device 114, and be supplied via the communication interfaces 121, 123 to the determination device 110. The determination device 110 may determine three-dimensional Cartesian coordinates for each one of the storage goods 102 and for each one of the storage regions 104 on the basis of the captured storage region identification devices 106 and storage goods identification devices 108, and may store the correlation of the storage regions 104 with the storage goods 102 stored therein as well as their position information.

The interrogation device 112 may access these data. A re-order may be triggered by the re-order device 118, if determination results of the determination device 110 show that there is a need in individual storage regions 104 for the subsequent delivery of associated storage goods 102. Alternatively or in addition, as will be described in more detail below with reference to FIG. 6 to FIG. 11, a re-order may be effected also by a corresponding operation of the portable user interface 116 (for example, a mobile phone or an Augmented Reality pair of spectacles). To this end, the portable user interface 116 may be provided with a communication interface 131, which may, in the illustrated embodiment example, communicate wirelessly with the communication interface 123 of the processor 122 and thus with the determination device 110.

With the inventory management system 100 according to FIG. 1, a quick, error-robust and simple management of highly complex storehouses having many different storage goods 102 and many different storage regions 104 may be possible. The inventory management system 100 may be arbitrarily scalable, and may dynamically capture and trace changes in the stock of goods. Via the portable user interface 116, a user activity may be input optionally in the inventory management system 100. Furthermore, in view of the described operation, the inventory management system 100 may operate particularly error-robustly.

The robot device illustrated as the handling device 161 may, for example upon request from the production, safely withdraw individual storage goods 102 out of associated storage regions 104 by means of the previously determined three-dimensional coordinates, and may bring them to a destination. Also, a refilling of vacated storage regions 104 may be effected error-free and operationally safe by such a robot device.

The user position finding device 120 may avoid that dangerous collisions between a user and movable components of the inventory management system 100 (see the camera of the capturing device 114 and the handling device 161) may occur. In the case of a threatening collision, the movable components may be controlled such that they may not collide with a user. It may also be possible to output an alarm in this case.

Figure 2:
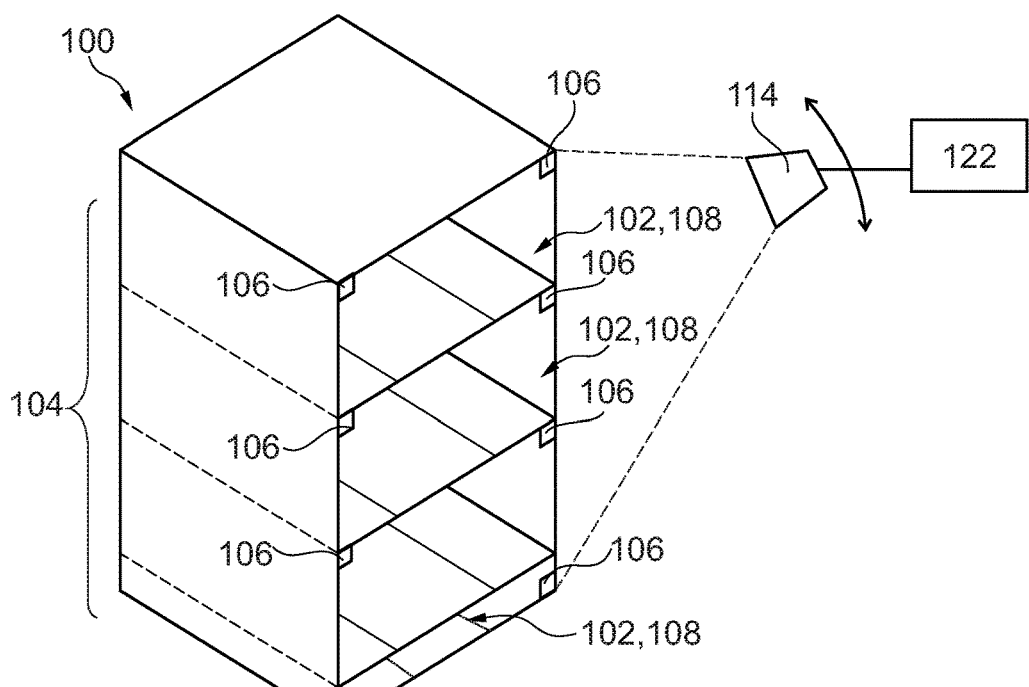
FIG. 2 shows a spatial view of storage regions in the form of a rack of an inventory management system according to an exemplary embodiment example of the invention.

FIG. 2 shows a spatial view of storage regions 104 in the form of a shelf of an inventory management system 100 according to an exemplary embodiment example of the invention.

FIG. 2 thus shows a three-dimensional illustration of the storage regions 104 and the movable capturing device 114. The determination device 110 contained in the processor 122 may capture (or measure) three-dimensional space coordinates in a Cartesian coordinate system (x, y, z) for each one of the storage regions 104 and/or each one of the storage goods 102, and may store them in a data record. The capturing device 114 may serve for capturing and for monitoring the goods in stock of the storehouse.

Figure 3:
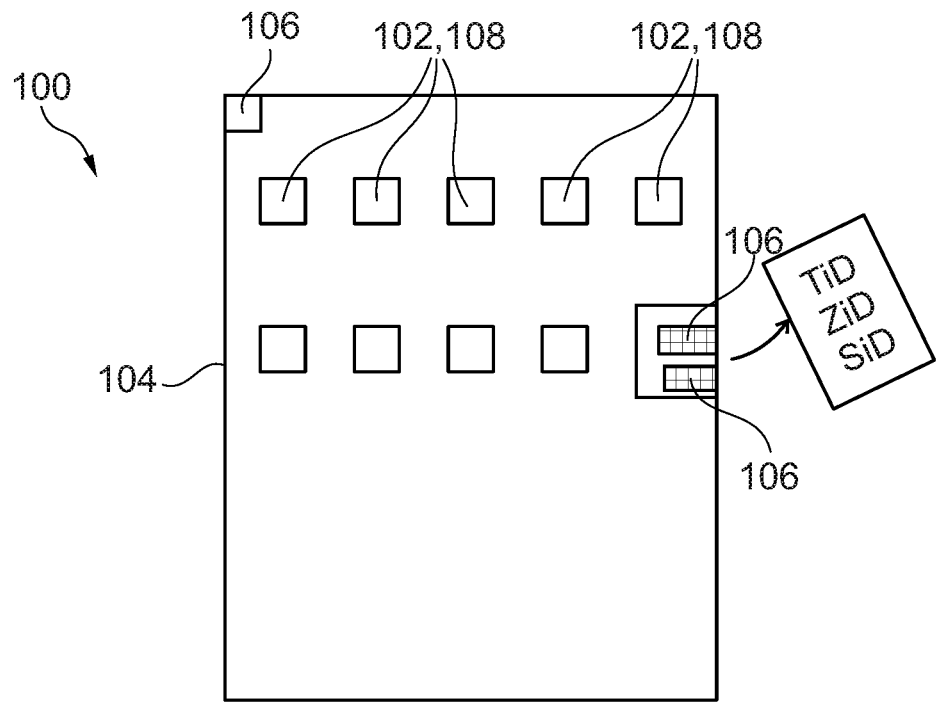
FIG. 3 and FIG. 4 show parts of an inventory management system according to an exemplary embodiment example of the invention.
Figure 4:
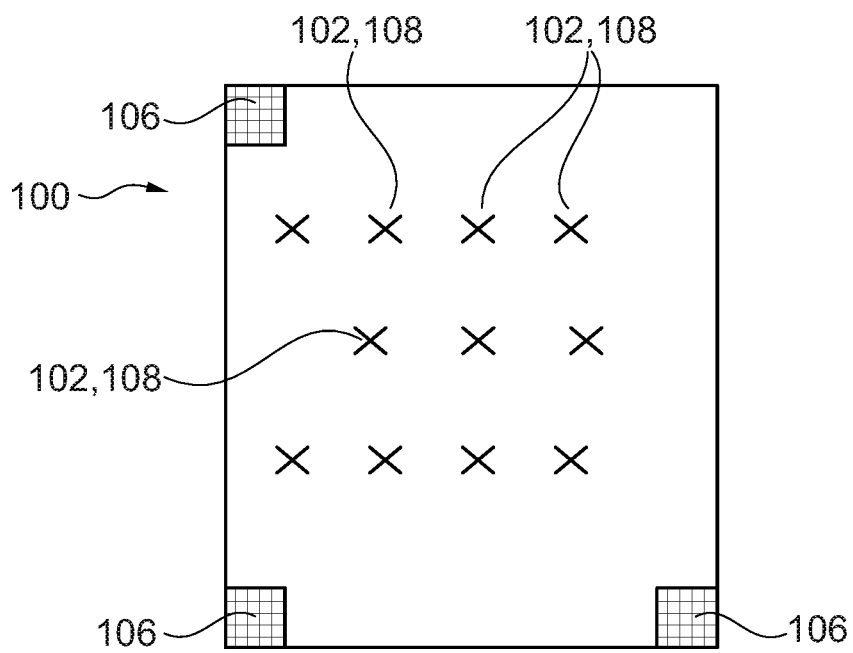

FIG. 3 and FIG. 4 show parts of an inventory management system 100 according to an exemplary embodiment example of the invention.

With the inventory management system 100 according to FIG. 3 and FIG. 4, a definition of the spatial regions of the rack, which may form spatial regions of the storage regions 104, may be effected initially by QR codes. Initially, two-dimensional Cartesian coordinates may be associated to the individual objects, that is the storage goods 102 and the storage regions 104. A user may move the user interface 116, for example a mobile communication device having a camera function, along the inventory management system 100. A software may capture the barcodes and/or QR codes at the storage goods 102 and/or the storage regions 104, and may associate two-dimensional coordinates to the former. Then, by an according data processing of the captured image data, a set of three-dimensional space coordinates for the storage goods 102 and the associated storage regions 104 may be determined and stored in a database.

Figure 5:
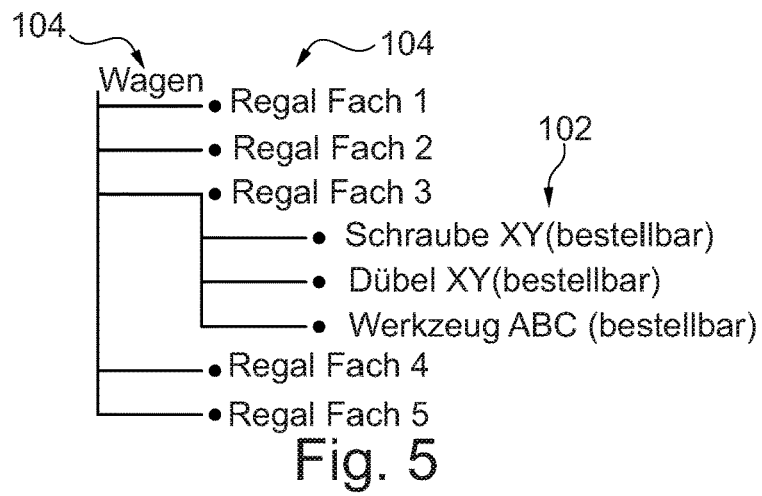
FIG. 5 shows a logical hierarchy of storage regions and associated storage goods according to an exemplary embodiment example of the invention.

FIG. 5 shows a logic hierarchy of storage regions 104 and associated storage goods 102 according to an exemplary embodiment example of the invention. FIG. 5 shows by way of example a hierarchical data structure, which may assign individual storage goods 102 (screw, dowel, tool) to the storage regions 104 of different hierarchy levels (wagon and/or shelf).

Figure 6:
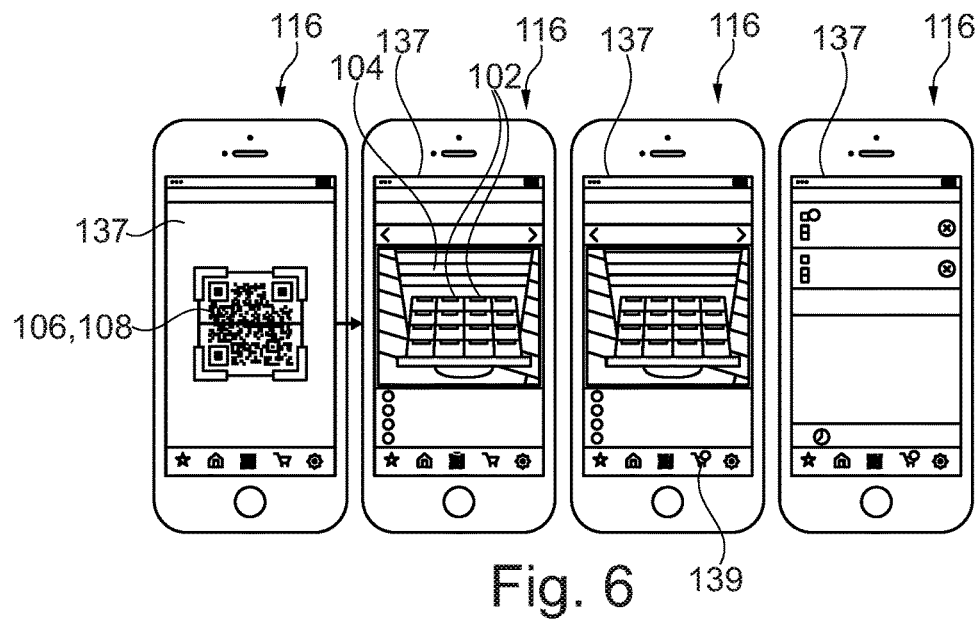
FIG. 6 shows a portable user interface according to an exemplary embodiment example of the invention in different operational states during the performing of a re-order.

FIG. 6 shows a user end device and/or a portable user interface 116 according to an exemplary embodiment example of the invention in different operational states during the performing of a re-order.

FIG. 6 shows a display device 137 with input function (touchscreen) of a portable user interface 116 implemented as a mobile communication device in different states of operation during the performing of a re-order.

Initially, by a scanning function of the portable user interface 116, a QR code may be captured as an example for a storage region identification device 106 or a storage goods identification device 108 (see the left illustration). By the information contained therein, an associated storage region 104 with storage goods 102 may then be displayed to a user (see the second illustration from the left). By actuating a display field 139 on the display device 137, a user may then select the displayed storage goods 102 for an order or re-order (see the second illustration from the right). Subsequently, a corresponding re-order may be triggered (see the field "order" in the illustration at the right).

Figure 7:
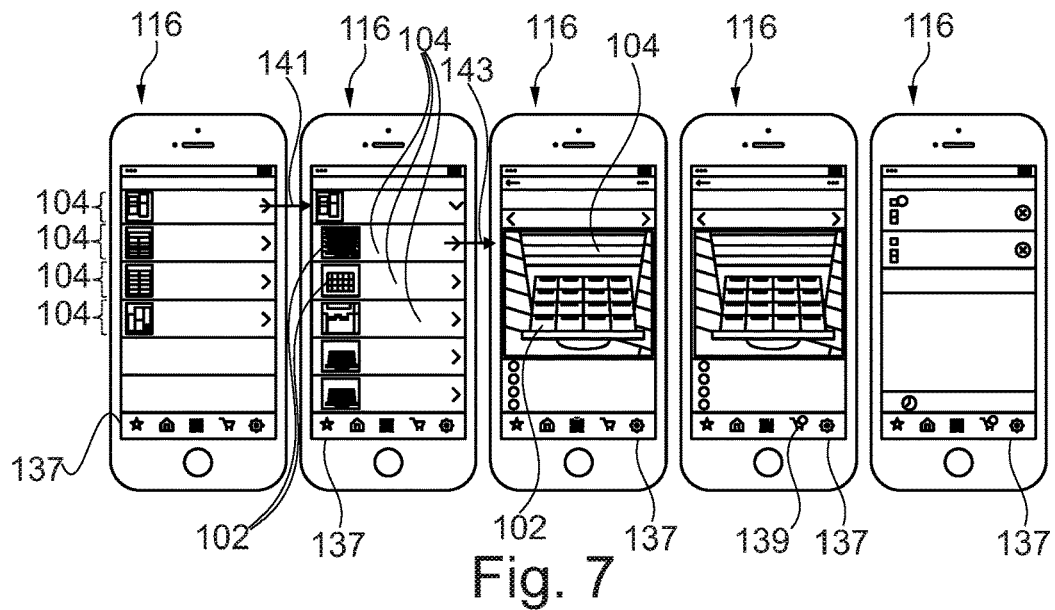
FIG. 7 shows a portable user interface according to another exemplary embodiment example of the invention in different operational states during the performing of a re-order.

FIG. 7 shows a portable user interface 116 according to another exemplary embodiment example of the invention in different states of operation during the performing of a re-order.

FIG. 7 shows the user interface 116 during the performing of another method for re-ordering. Herein, initially, a selection may be made by a user from a super-ordinate hierarchical illustration of storage regions 104 of a storehouse (illustration at the leftmost), as is represented schematically by an arrow 141. The user then may arrive at a lower hierarchy of storage regions 104, in which also storage goods 102 may be represented (second illustration from the left in FIG. 7). As is schematically represented with an arrow 143, a user may then make a selection of a storage region 104 with associated storage goods 102 (illustration in the middle in FIG. 7). The re-order procedure may then be terminated as is shown in the two illustrations at the right-hand side of FIG. 7, which corresponds to the two illustrations at the right-hand side of FIG. 6.

FIG. 8 to FIG. 11 show a user end device and/or a portable user interface 116 of the inventory management system 100 according to an exemplary embodiment example of the invention in different states of operation during the performing of an Augmented Reality application. Stated more precisely, FIG. 8 to FIG. 11 show a portable user interface 116 that may be implemented as a smartphone, in which storage goods 102 and associated storage regions 104 are illustrated. Augmented Reality information 145 may be superimposed, which may be found after the association of the storage goods 102 to the associated storage regions 104 by a database comparison (or matching) by means of the determination device 110, and which information 145 may be illustrated to the user at the display device 137 of the portable user interface 116 such that the information may be superimposed to the associated storage good 102 or storage region 104.

Figure 8:
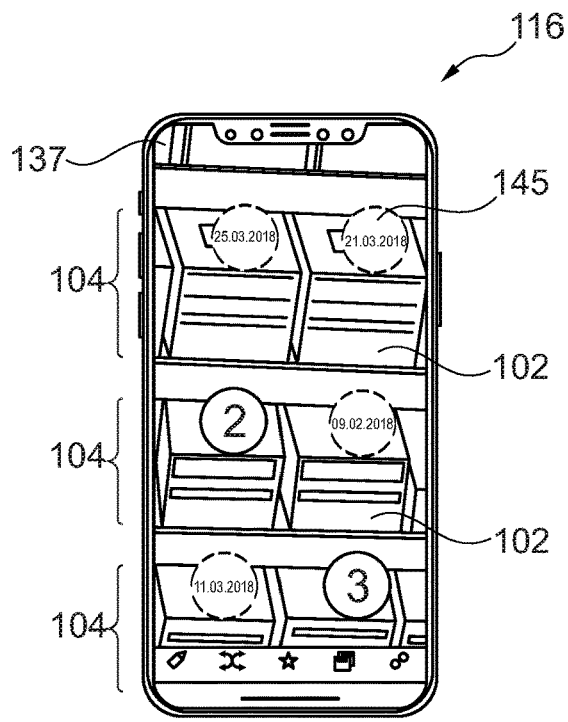
FIG. 8 to FIG. 11 show a portable user interface of the inventory management system according to an exemplary embodiment example of the invention in different operational states during the performing of an Augmented Reality application.

With reference to FIG. 8, the Augmented Reality field 145 illustrated there may be indicative for the fact that the last re-order is older than three days (maximum delivery time), that the date of the last order is indicated and/or which amount has been ordered lastly.

Figure 9:
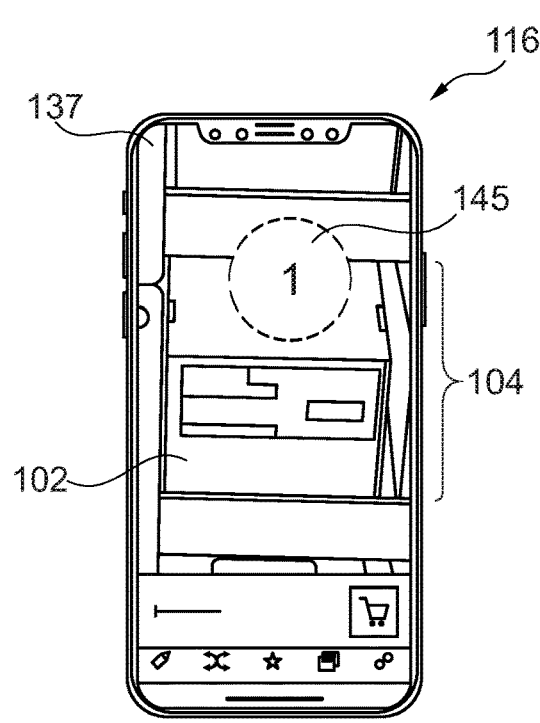

In FIG. 9, as Augmented Reality field 145, the information may be recognizable, which amount of storage goods 102 may be contained in the associated storage region 104 at a defined point in time.

Figure 10:
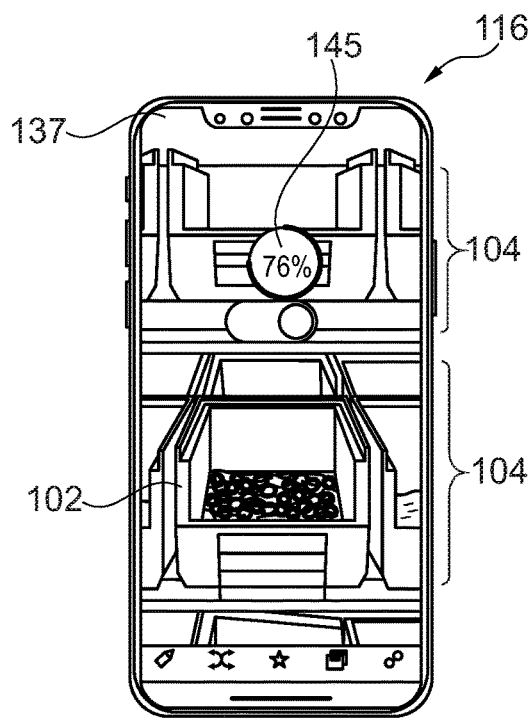

In FIG. 10, the Augmented Reality field 145 shown there illustrates a battery level of a dash button, which may be pushed for re-ordering storage goods 102 that may be associated to a storage region 104.

Figure 11:
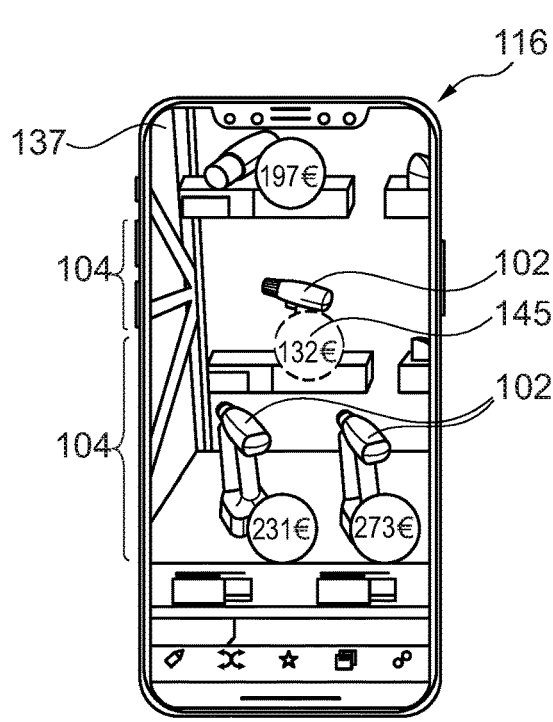

In FIG. 11, there is shown as an Augmented Reality field 145, a user-related price for the re-ordering of a storage good 102. To this end, it may be looked up in a database, which prices a user, who may be associated to the portable user interface 116, may receive for the delivery of particular storage goods 102.

Supplementarily, it is to be pointed out that "having" excludes no other elements or steps, and that "a" or "an" excludes no plurality. Furthermore, it should be pointed out that features or steps, which have been described with reference to one of the above embodiment examples, can be used also in combination with other features or steps of other embodiment examples described above. Reference numerals in the claims are not to be considered as a limitation.

The invention claimed is:

1. An inventory management system, comprising:
   a plurality of storage regions, which are to be loaded with storage goods;
   a plurality of storage goods, which are arranged at the storage regions;
   a plurality of storage region identification devices, of which each one is located on an associated one of the storage regions, wherein at least a part of the storage region identification devices defines a spatial delimitation of an associated one of the storage regions;
   a plurality of storage goods identification devices, of which each one is located on an associated one of the storage goods;
   a surveillance space and a non-surveillance space, wherein at least a part of the storage regions and of the storage goods are arranged in the surveillance space;
   a movable and/or rotatable camera which captures captured data that map at least a part of the storage regions and/or at least a part of the storage goods, the captured data representing the storage region identification devices and the storage goods identification devices, wherein the camera is capable to capture both the surveillance space and the non-surveillance space; and
   a processor which is configured to limit an activity of the camera to delimit a spatial capturing region of the camera to the surveillance space, so that the camera exclusively captures data in the surveillance space as a basis for a data record which is indicative for each one of the storage goods and for each one of the storage regions as to which storage good is located at which storage region at which position, and the camera does not capture data in the non-surveillance space;
   wherein the processor, which by recognizing the storage regions based on the captured data, by recognizing the storage region identification devices and the storage goods identification devices and by recognizing positions of the storage region identification devices and the storage goods identification devices, determines the data record, which is indicative for each one of the storage goods and for each one of the storage regions as to which storage good is located at which storage region at which position;
   the inventory management system further comprising a user position finding device, which is configured for finding a position of at least one human user in the region of the inventory management system, and for controlling the inventory management system such that movable components of the inventory management system are positioned only in observance of a prescribable safety distance to a position-found user;
   wherein the processor converts data, which have been captured by the camera and which are indicative for two-dimensional space coordinates of at least a part of the storage goods and/or of at least a part of the storage regions, to three-dimensional space coordinates of at least a part of the storage goods and/or of at least a part of the storage regions.

2. The inventory management system according to claim 1, comprising at least one of the following features:
   having an interrogating device, which is configured to interrogate, by an interrogation at the processor, for each one of the storage goods at least one associated storage region, at which a respective storage good is located and/or to interrogate, by an interrogation at the processor, for each one of the storage regions at least one associated storage good, which is located at the respective storage region;
   wherein the storage goods are selected from a group that consists of: tools, fluid sources, C-materials, vouchers for an article and/or a service, and a dash button;
   wherein the storage regions are selected from a group that consists of: a rack or a shelving board of a rack, a tool and gear wagon or a part of a work surface or a drawer of the tool and gear wagon, a carrying case or a part of a carrying case compartment of a carrying case, a wall-mountable suspension position or a part of a wall-mountable suspension position, and a storage box or a part of a storage box;
   wherein the storage region identification devices are selected from a group that consists of: a transponder, an RFID tag, an optically readable barcode, a QR code or an alphanumeric code, a predetermined geometrical outline, and an arrangement of predetermined geometrical outlines for a definition of outer delimitations of an associated storage region;
   wherein the storage goods identification devices are selected from a group that consists of: a transponder, an RFID tag, an optically readable barcode, a QR code or an alphanumeric code, and a predetermined geometrical outline;
   having a user interface for displaying at least a part of the data record and/or for inputting at least one control command for controlling the inventory management system, wherein the user interface is configured for displaying at least a part of the data record by Augmented Reality;
   wherein the processor determines the data record such that the data record for each one of the storage goods is indicative as to in which one of plural sub-regions of a respective storage region the respective storage good is located.

3. The inventory management system according to claim 1,
wherein the processor receives image data from at least one camera for capturing image data, which camera is movable along the storage regions and/or along the storage goods and/or is rotatable, and/or at least one transponder reading device for capturing transponder data, which transponder reading device is movable along the storage regions and/or along the storage goods.

4. The inventory management system according to claim 3,
wherein the processor determines at least a part of the storage regions and/or at least a part of the storage goods by image recognition based on image data that have been captured by the at least one camera, by using the storage region identification devices and/or the storage goods identification devices.

5. The inventory management system according to claim 1,
wherein the processor identifies, as at least a part of the data record, three-dimensional space coordinates for at least a part of the storage goods and for at least a part of the storage regions.

6. The inventory management system according to claim 5,
wherein the processor associates space coordinates of the storage goods to space coordinates of a respective associated storage region.

7. The inventory management system according to claim 1, further comprising:
a re-ordering device, which is configured to trigger a re-order of at least one of the storage goods, if a predetermined re-order event is captured.

8. The inventory management system according to claim 7, comprising at least one of the following features:
wherein the presence of a re-order event is capturable by the camera;
wherein the presence of a re-ordering event is capturable in the form of a user activity, by a predetermined user gesture that has been captured by the camera, pointing to a storage good to be re-ordered and/or a storage region associated to a storage good to be re-ordered;
wherein the predetermined re-order event is selected from a group that consists of: the lowering of a number of remaining storage goods at at least one associated storage region below a predetermined threshold value, an information that is indicative for the withdrawal of at least a predetermined number of storage goods from at least one associated storage region, a re-order command at the side of the user, and an information indicating a withdrawal need.

9. A method for managing an inventory having a plurality of storage regions, which are to be loaded with storage goods, and a plurality of storage goods, which are arranged at the storage regions, and wherein a respective one of a plurality of storage goods identification devices is located on an associated one of the storage goods, wherein the inventory comprises a surveillance space and a non-surveillance space, wherein at least a part of the storage regions and of the storage goods are arranged in the surveillance space, the method comprising:
capturing, by a movable and/or rotatable camera, of captured data that map at least a part of the storage regions and/or at least a part of the storage goods, the captured data representing the storage region identification devices and the storage goods identification devices, wherein the camera is capable to capture both the surveillance space and the non-surveillance space;
wherein an activity of the camera is limited to delimit a spatial capturing region of the camera to the surveillance space, so that the camera exclusively captures data in the surveillance space as a basis for a data record which is indicative for each one of the storage goods and for each one of the storage regions as to which storage good is located at which storage region at which position, and the camera does not capture data in the non-surveillance space;
recognizing the storage regions based on the captured data;
recognizing the storage region identification devices, wherein a respective one of a plurality of storage region identification devices is located on an associated one of the storage regions, and the storage goods identification devices, and of locations of the storage region identification devices and the storage goods identification devices, wherein at least a part of the storage region identification devices defines a spatial delimitation of an associated one of the storage regions;
determining the data record based on the recognized storage region identification devices and storage goods identification devices and their locations, wherein the data record is indicative, for each one of the storage goods and for each one of the storage regions as to which storage good is located at which storage region at which position; and
providing a user position finding device, which is configured for finding a position of at least one human user in the storage regions, and for controlling the position of movable components positioned in observance of a prescribable safety distance to a position-found human user in the storage regions;
wherein converted data, captured by the camera and which are indicative for two-dimensional space coordinates of at least a part of the storage goods and/or of at least a part of the storage regions, are converted to three-dimensional space coordinates of at least a part of the storage goods and/or of at least a part of the storage regions.

10. A non-transitory computer-readable storage medium, in which is stored a program, or a software program as such, for an inventory management system for managing an inventory store having a plurality of storage regions, which are to be loaded with storage goods, and a plurality of storage goods, which are arranged on the storage regions, wherein the inventory management system comprises a surveillance space and a non-surveillance space, wherein at least a part of the storage regions and of the storage goods are arranged in the surveillance space, which program or software program, when executed by one or processors, executes and/or controls a method, comprising:
capturing, by a movable and/or rotatable camera, of captured data that map at least a part of the storage regions and/or at least a part of the storage goods, the captured data representing the storage region identification devices and the storage goods identification devices, wherein the camera is capable to capture both the surveillance space and the non-surveillance space;
recognizing the storage regions based on the captured data;
wherein an activity of the camera is limited to delimit a spatial capturing region of the camera to the surveillance space, so that the camera exclusively captures data in the surveillance space as a basis for a data record which is indicative for each one of the storage goods and for each one of the storage regions as to which storage good is located at which storage region at which position, and the camera does not capture data in the non-surveillance space;

recognizing the storage region identification devices and the storage goods identification devices, wherein a respective storage region identification device is located on an associated one of the storage regions, and of locations of the storage region identification devices and the storage goods identification devices, wherein at least a part of the storage region identification device defines a spatial delimitation of an associated one of the storage regions;

determining the data record based on the recognized storage region identification devices and storage goods identification devices and their locations, wherein the data record is indicative, for each one of the storage goods and for each one of the storage regions as to which storage good is located at which storage region at which position; and providing a user position finding device, which is configured for finding a position of at least one human user in the storage regions, and for controlling the position of movable components positioned in observance of a prescribable safety distance to a position-found human user in the storage regions;

wherein converted data, captured by the camera and which are indicative for two-dimensional space coordinates of at least a part of the storage goods and/or of at least a part of the storage regions, are converted to three-dimensional space coordinates of at least a part of the storage goods and/or of at least a part of the storage regions.

* * * * *